United States Patent [19]
Nordhagen

[11] 3,861,071
[45] Jan. 21, 1975

[54] LURE RETRIEVER
[76] Inventor: Paul Nordhagen, Box 15, Westby, Mont. 59275
[22] Filed: Dec. 3, 1973
[21] Appl. No.: 421,243

[52] U.S. Cl. ................................................ 43/17.2
[51] Int. Cl............................................. A01k 97/00
[58] Field of Search................................. 43/17.2, 5

[56] References Cited
UNITED STATES PATENTS
| | | | |
|---|---|---|---|
| 2,609,632 | 9/1952 | Davis | 43/17.2 |
| 3,176,425 | 4/1965 | Mudd | 43/17.2 |
| 3,568,353 | 3/1971 | Kilgore | 43/17.2 |
| 3,643,366 | 2/1972 | Gates | 43/17.2 |

*Primary Examiner*—Louis G. Mancene
*Assistant Examiner*—Daniel J. Leach
*Attorney, Agent, or Firm*—Robert E. Kleve

[57] ABSTRACT

A lure retriever comprising a steel strap having a J-shaped edgewise configuration, the lower curved end of the strap being formed with pointed jaws for engagement with a stuck fishing lure. An eyelet is mounted on the upper end of the strap, projecting horizontally directly over the jaws and receives the fishing line of the lure for guiding the strap to the lure. A bore through the upper end of the strap is provided for attachment of a lowering rope.

3 Claims, 3 Drawing Figures

LURE RETRIEVER

This invention relates to lure retrievers.

It is an object of the invention to provide a novel lure retriever having a J-shaped side edge configuration with pointed jaws at its lower curved end and with an eyelet at its upper end projecting horizontally over the pointed jaws, and which retriever is lowered by a rope with the fishing line traveling in the eyelet to retrieve stuck lines by the jaws engaging the lure from the underside.

It is an object of the invention to provide a novel lure retriever having a J-shaped side edge configuration with a jaw at the lower outer curved end of the retriever to engage a stuck lure from the underside and an eyelet on the retriever for the fishing line of the lure to travel through when lowering the retriever and rope attached to the retriever to raise and lower the retriever.

Further objects and advantages of the invention will become apparent as the description proceeds and when taken in conjunction with the accompanying drawing wherein.

Briefly stated, the invention comprises a lure retriever having a J-shaped side edge configuration with pointed jaws at its lower curved end to engage the underside of a stuck lure and an eyelet on the retriever for the fishing line of the stuck lure to travel through when lowering the retriever for engagement with the lure, and a rope attached to the retriever for raising and lowering the retriever along the fishing line.

Figure 1:
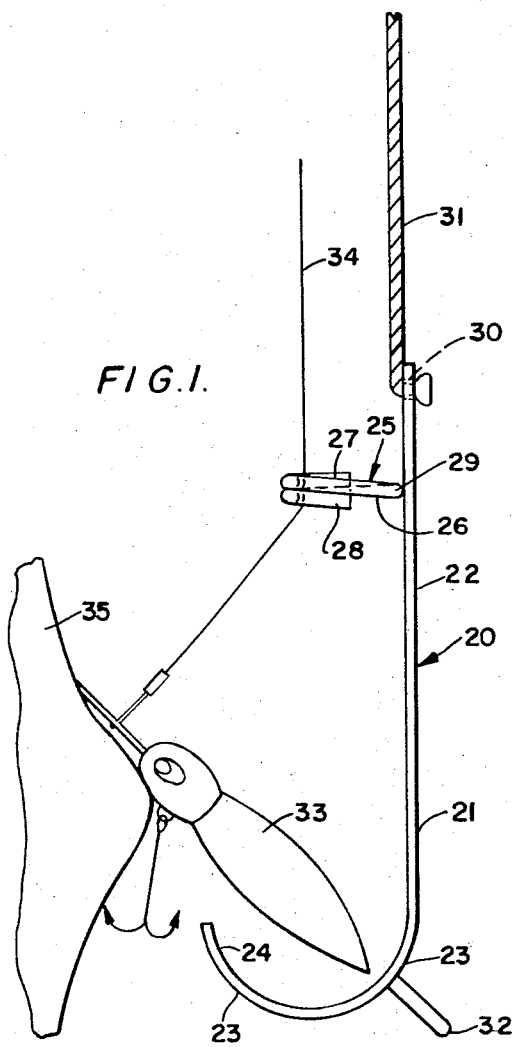
FIG. 1 is a side elevational view of the J-shaped lure retriever with the pointed jaws at the lower curved end of the retriever about to engage the underside of a stuck lure to disengage the lure from a sunken object.
Figure 2:
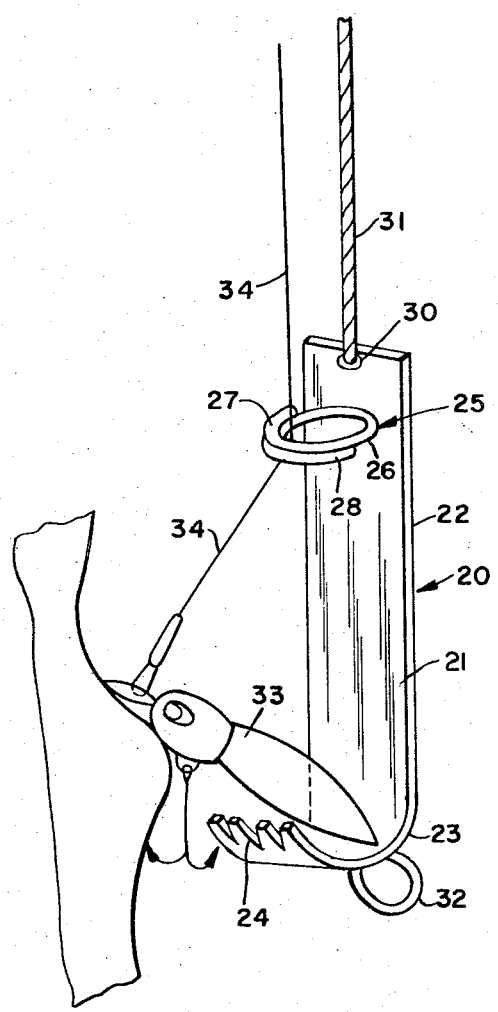
FIG. 2 is a perspective view of the lure retriever in its lowered position and about to engage the stuck line to disengage the lure from a sunken object.

Referring more particularly to the drawing, in FIGS. 1 and 2, the fish lure retriever plate 20 is illustrated forming a J-shaped steel metal strap retriever plate 21. The J-shaped strap retriever plate has a straight upright upper portion 22 and a curved lower portion 23. The curved lower portion 23 has pointed jaws 24. An eyelet 25 is fixed to the upper portion 22 of the plate or strap 21 and projects horizontally outward directly over the curved lower portion 23 in spaced relation.

Figure 3:
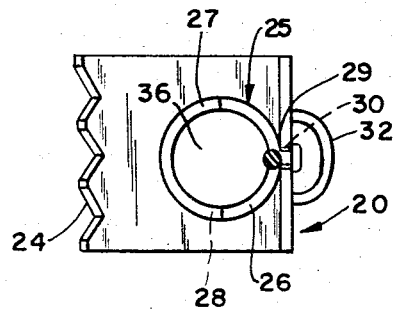
FIG. 3 is a top plan view of the lure retriever.

The eyelet 25 is formed of a steel rod 26 which rod 26 is curved into a circle with its outer ends 27 and 28 overlapping one another, as illustrated in FIGS. 1, 2, and 3. The steel rod has a certain amount of resiliency. The center 29 of the rod 26 is welded to the straight upper portion 22 of the J-shaped strap.

The straight upper portion 22 also has a bore 30 therethrough. A nylon rope 31 has its lower end passing through the bore 30 with its outermost end tied into a knot, which knot is bigger than the bore 30, to thereby fix the rope 31 to the J-shaped plate or strap 21.

A circular steel ring 32 projects rearward from the lower curved portion 22 of the plate 21 with one edge of the ring 32 welded to the curved portion of the J-shaped plate for a purpose to be described.

OPERATION

The lure retriever apparatus operates as follows:

In the event a fishing lure 33 attached to a fishing line 34 becomes stuck on a submerged object 35 while fishing in the water, the fisherman will take an intermediate portion of the fishing line 34, form it into a loop, bend the outer end 28 of the steel rod 26 downward slightly and loop the looped portion of the fishing line 34 over the outer end 28 of the rod 26. Thereupon, the fisherman will slide the looped portion of the fishing line counterclockwise when viewed from FIG. 3, so that the fishing line passes counterclockwise between the outer ends 27 and 28 of the rod, until the fishing line reaches and passes beyond the outer end 27 of the rod 26, which thereby places the fishing line 34 in the center 36 of the eyelet 25.

Once the fishing line has been placed in the center of the eyelet 25, the fisherman will lower the retriever plate into the water, the retriever plate, as it submerges downward into the water, will move along the fishing line by the eyelet 25 sliding along fishing line 34, thereby guiding the retriever plate 20 down to the stuck lure at the lower end of the fishing line. The fisherman will continue lowering the retriever plate 20 until the pointed jaws 24 slide below the lower end of the lure 33 until it reaches its position shown in FIGS. 1, 2, and 3 with the jaws 24 directly below the lower end of the stuck lure.

Thereupon the fisherman will pull the nylon rope upward suddenly, raising the retriever plate 20, which causes the pointed jaws 24 of the retriever plate to engage the underside of the stuck lure and pivot the lure upward while the eyelet 25 slides upward along the fishing line 34. The upward pivoting movement of the fishing lure and the sudden upward movement of the retriever plate will, in most cases, cause the stuck lure 33 to become disengaged from the submerged object 35.

In some instances pointed jaws 24 will be made to engage into the fish hooks of the stuck lure by the upward movement of the retriever plate 21, depending upon the configuration and type of lure being retrieved.

In normal operator, once the jaws 24 have slid below the stuck lure, the operation will pull the nylon rope 31 upward suddenly several times, so that the retriever plate 20 engages the lure 33 from the underside or engages into the hooks of the stuck lure 33 by the sudden upward jerks and will continue pulling the retriever plate 20 upward once the jaws or curved portion have engaged the lure or hooks of the lure, which action will normally be sufficient to disengage the lure 33 from the sunken object 35.

Thereafter, the retriever plate 20 may be raised to the surface by raising the rope 31 upward or by winding the rope 31 onto a reel.

The fishing line may also be reeled in at the same time. The retriever plate may raise the lure with it if the lure remains caught on the retriever plate or it may be raised by the fishing line.

The steel plate 21 will be tempered in the bend or curve portion 23 of the plate so that it will not straighten out under even severe jerks by the fisherman.

The plate 20 may be made in different sizes of different size lures.

A second rope may be attached to the eyelet or ring 32 of a different color. The second rope will be used in the event the retriever plate, itself, becomes stuck between two objects, for example, such as being stuck between two sharp rocks. In the event the retriever plate 20 itself becomes stuck, the operator will pull the second rope which will cause the plate 21 to come unstuck and move upward in an upsidedown position.

While operating the retriever plate the fisherman will try to keep the fishing line 34 snug or taut. Normally the lure will become unstuck on the first try or first upward jerk of the retriever plate.

Thus it will be seen that a novel lure retriever apparatus has been provided which quickly and easily disengages fishing lures from objects submerged in the water.

It will be obvious that various changes and departures may be made to the invention without departing from the spirit thereof and accordingly, it is not intended that the invention be limited to that specifically described in the specification or as illustrated in the drawing but only as set forth in the appended claims wherein:

What is claimed is:

1. A lure retriever comprising a steel strap retriever plate which has a J-shaped edgewise configuration, said J-shaped strap retriever plate having a forwardly curved lower end portion with pointed jaws at the outer end of the curved portion for engagement against a stuck fishing lure, an eyelet mounted to an upper portion of the steel strap retriever plate and projecting forward over the curved portion with said eyelet receiving the fishing line of the stuck lure for guiding the retriever plate to the lure, said strap retriever plate having a bore at its upper end for attachment of a rope to raise and lower the retriever plate along the fishing line.

2. A lure retriever according to claim 1, wherein said eyelet is formed of a rod with overlapping ends and is made of resilient material so that the fishing line may be inserted between the overlapping ends of the rod to place the fishing line inside the eyelet of the retriever plate.

3. A lure retriever according to claim 1, wherein said retriever plate has a second eyelet for attachment of a second rope to also move the plate by the second rope in the event the lure retriever becomes stuck between two submerged objects.

* * * * *